US005471377A

United States Patent [19]

Dönig et al.

[11] Patent Number: 5,471,377

[45] Date of Patent: Nov. 28, 1995

[54] PROCESS FOR CONTROLLING A POWER SUPPLY WHICH SUPPLIES POWER TO AN ELECTROSTATIC FILTER IN WHICH SECONDARY CIRCUIT STATES ARE DETERMINED BASED ON MEASURED PRIMARY CIRCUIT VALUES AND IN WHICH SHORT CIRCUITS ARE DETECTED

[75] Inventors: Gerhard Dönig, Erlangen; Roland Hümpfner, Herzogenaurach; Norbert Grass, Feucht; Hans-Joachim Knaak, Erlangen; Franz Neulinger, Erzhausen; Helmut Schummer, Heusenstamm, all of Germany

[73] Assignee: Siemans Aktiengesellschaft, München, Germany

[21] Appl. No.: 930,696

[22] Filed: Dec. 4, 1992

[30] Foreign Application Priority Data

Apr. 4, 1990 [DE] Germany .................................. 9000262

[51] Int. Cl.[6] ........................................ H02M 3/335

[52] U.S. Cl. ............................ 363/21; 363/97; 323/903; 96/23; 95/6

[58] Field of Search .................... 55/102, 105; 323/903; 363/95, 97, 98, 55, 59, 16, 20, 21, 15, 17, 34, 36, 37; 361/79; 95/7; 96/24

[56] References Cited

U.S. PATENT DOCUMENTS

| | | | |
|---|---|---|---|
| 4,432,061 | 2/1984 | Herklotz et al. | 55/105 X |
| 4,605,424 | 8/1986 | Johnston | 55/105 X |
| 4,670,829 | 6/1987 | Dallhammer et al. | 363/903 X |
| 4,779,182 | 10/1988 | Mickal et al. | 323/903 X |
| 4,873,620 | 10/1989 | Neulinger et al. | 363/903 X |

FOREIGN PATENT DOCUMENTS

| | | |
|---|---|---|
| 0206160 | 12/1986 | European Pat. Off. . |
| 1457258 | 11/1969 | Germany . |
| 1557061 | 4/1970 | Germany . |
| 3522569 | 1/1987 | Germany . |

OTHER PUBLICATIONS

Dubbel, Taschenbuch Für Den Maschinenbau, Springer Verlag, 1986, 15th Edition, W. Beitz et al., pp. 1201–1202.

*Primary Examiner*—Peter S. Wong
*Assistant Examiner*—Y. Jessica Han
*Attorney, Agent, or Firm*—Kenyon & Kenyon

[57] ABSTRACT

A filter short circuit is detected when the primary voltage of the high-voltage transformer drops below a specified minimum value and does not rise above the specified minimum value during a specified delay period and a filter current is greater than a specified minimum current. No current is drawn from the external current supply for a variable time delay when a filter short circuit is detected. A filter short circuit count is incremented when a filter short circuit is detected. When the count exceeds a specified, variable limit within a specified, variable time span, the indirect converter is disconnected.

19 Claims, 1 Drawing Sheet

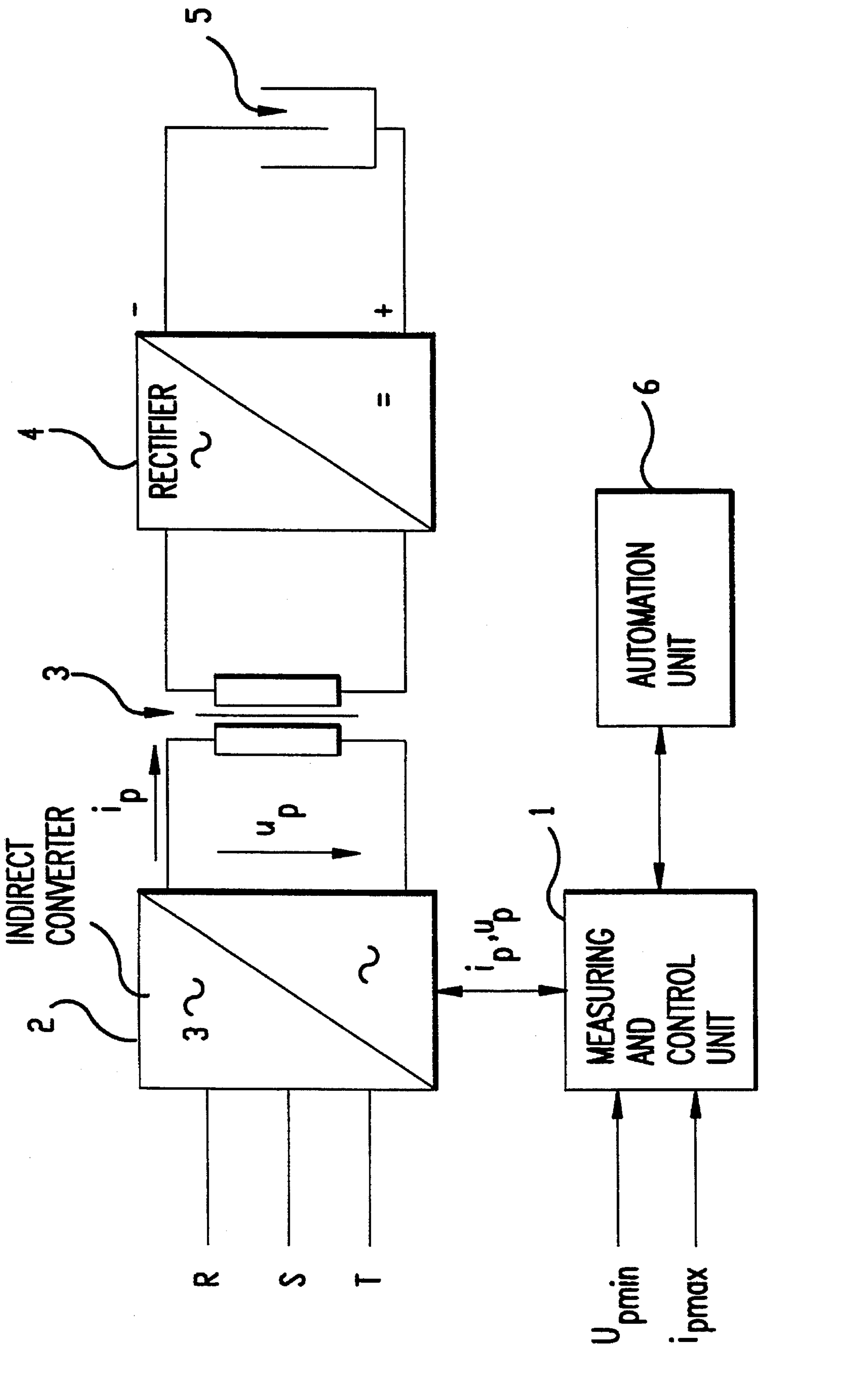
5
4
RECTIFIER
~
=
-
+
3
INDIRECT
CONVERTER
2
3~
~
i p
u p
i p ,u p
1
MEASURING
AND
CONTROL
UNIT
6
AUTOMATION
UNIT
R
S
T
U pmin
i pmax

PROCESS FOR CONTROLLING A POWER SUPPLY WHICH SUPPLIES POWER TO AN ELECTROSTATIC FILTER IN WHICH SECONDARY CIRCUIT STATES ARE DETERMINED BASED ON MEASURED PRIMARY CIRCUIT VALUES AND IN WHICH SHORT CIRCUITS ARE DETECTED

BACKGROUND OF THE INVENTION

The present invention relates to a process for controlling the power supply of an electrostatic filter, and in particular, to a power supply including an indirect converter (e.g. a three phase to one phase converter) being equipped with a measuring and control unit, and a high-voltage transformer.

Power supply devices of the above-mentioned type are disclosed, for example, by the German Published Patent Application 35 22 569. A major disadvantage associated with the previously known control process is that, to determine the states of the secondary-circuit, the filter current and the filter voltage in the secondary circuit (i.e., on the high-voltage side of the transformer) must be measured. Devices for measuring current and voltage under high voltage conditions are expensive and susceptible to faults. In addition, extensive shielding and insulating measures must be taken to ensure safety for service personnel. On the other hand, determining the states of the secondary-circuit is absolutely necessary since the electrostatic filter is supposed to be controlled as optimally as possible and, to accomplish this optimal control, the setpoint values, for example those for the intermediate-circuit current, must be constantly adapted.

Due to the above-described problems with measuring voltage and current under high-voltage conditions, up until now the setpoint selection for values (e.g., intermediate-circuit current, pulse repetition rate or pulse duration) was made by measuring the characteristic filter curve. Using this measurement, new setpoint values were then specified manually based on the experience of the service personnel.

However, when using the characteristic filter curve for setpoint selection, the reliability and accuracy of the selection depends on the experience and attentiveness of service personnel which leads to high labor costs.

As mentioned earlier, the electrostatic filter must be operated optimally, particularly due to strengthened environmental laws. Since the breakdown (i.e., disruptive discharge) voltage of the filter changes during operation, the setpoint values must always be redefined and adapted to enable an optimal operation. Even trained personnel cannot constantly adapt the setpoint values because of the speed at which the breakdown voltage changes.

A first object of the present invention is to provide a method for setpoint selection in which measuring voltage and current in the secondary circuit under high-voltage conditions is not required. Another object of the present invention is to accelerate and automate the setpoint selection so that the electrostatic filter may be optimally controlled and so environmental protection regulations may be met. In addition, for reasons of economic efficiency, retrofiting existing installations with the control process according to the invention should be possible. Furthermore, the automation in setpoint selection should reduce personnel costs.

SUMMARY OF THE INVENTION

The method of the present invention solves the aforementioned objectives by measuring current and voltage values of the primary-circuit by a measuring and control unit, and automatically determining states of the secondary-circuit from the values measured on the primary side.

In general, actual values, for example the primary voltage, are measured in the primary circuit. However, measuring setpoint values, actual values and combinations of actual and setpoint values, or other combinations may also be effective.

In an advantageous refinement of the control process, the actual current and voltage values of the secondary-side are calculated based on the actual current and voltage values of the primary-side. Using these values, the electrostatic filter is tested for filter breakdown and filter short circuit.

The electrostatic filter can be operated with direct current, with current pulses, or with a combination of both. When the electrostatic filters are operated with current pulses, several small measuring pulses are applied in the intervals between adjacent pulses. This permits meaningful values in primary circuit in the interpulse periods to be measured as well.

In another advantageous refinement of the present invention, a characteristic filter curve is recorded. This characteristic filter curve is then evaluated and, based on the evaluation, new setpoint values are determined, for example, for the intermediate-circuit current. The new setpoint values are calculated in an automation unit which is a device of higher order than the measuring and control unit.

BRIEF DESCRIPTION OF THE DRAWING

The FIG schematically depicts a device for implementing the closed-loop control process and the reference control process for setpoint selection according to the present invention.

DETAILED DESCRIPTION

An indirect converter (e.g., a three-phase to one-phase converter) 2 equipped with a measuring and control unit 1 supplies a voltage and current to a primary side of a high-voltage transformer 3. A secondary side of the high-voltage transformer 3 provides a voltage which is fed, via a rectifier 4, to an electrostatic filter 5. The measuring and control unit 1 is connected to a high order automation unit 6. The high order automation unit 6 can be a programmable controller (Siemens S5) or a personal computer, for example. The measuring and control unit 1 measures or continuously determines (e.g., each millisecond) in the primary circuit, intermediate-circuit current and primary voltage and, from these variables, determines filter current and filter voltage.

When the filter voltage from one measurement or calculation to the next drops from a value above a specified, variable minimum value, for example 5 kV, to a value less than a specified, variable percentage (for example 25%) of the variable minimum value (i.e., 1.25 kV) filter breakdown is detected. When the filter voltage then rises above this percentage within a specified, variable breakdown period of between 0 and 200 ms (for example 100 ms) a count for self-extinguishing breakdowns in the measuring and control unit 1 is incremented. Otherwise, a count for non-self-extinguishing breakdowns is incremented and a de-ionizing reaction is introduced. The filter 5 is subsequently recharged.

When the primary voltage of the high-voltage transformer 3 drops below a specified, variable minimum value in the range of 60 to 100 V (typically about 80 V) and does not rise again above this value during a specified, variable short-circuit delay period (for example 250 ms) and, at the same time, a filter current is greater than a specified, variable minimum current (for example 10% of the maximum current) then a filter short circuit is detected. When such a filter short circuit exists, the current supply into the intermediate circuit of the indirect converter 2 is blocked for a specified, variable delay (for example, 500 ms). Furthermore, the instant of filter short circuit is stored. The filter 5 is subsequently re-charged. If during a specified, variable time span (for example one minute) the number of filter short circuits exceeds a specified, variable maximum number (for example 10) then a sustained short circuit is recognized and the electrostatic filter 5 is disconnected.

Six commands, as well as possibly necessary parameters, are transmitted in intervals by the high level automation unit 6 to the measuring and control unit 1. These commands may include:

change the operating mode (d.c. current operation, pulse operation, mixed operation);

change the operating parameters and the new operating parameters; and record a characteristic filter curve.

When the measuring and control unit 1 receives the command for recording characteristic filter curves, it interrupts the normal operation of the electrostatic filter 5, records the characteristic filter curve, and transmits the data to the high order automation unit 6. The automation unit 6 displays the characteristic filter curve on a monitor (not shown), evaluates the transmitted data, and transmits new setpoint values to the measuring and control unit 1. New setpoint values can be specified for all variable values and include, for example:

manipulated variables, such as intermediate-circuit current and, in the case of pulse operation, the pulse duration;

comparison variables, such as the critical voltage for detecting of filter short circuit; and times, such as breakdown delay.

When the electrostatic filter 5 is operated with direct current, the characteristic filter curve is represented as a function of the filter voltage based on the filter current. When the electrostatic filter is operated with current pulses, the characteristic filter curve is represented as the filter voltage as a function of time. To permit the filter values on the primary side to be measured, small measuring pulses are applied periodically during the time interval between two pulses (for example with a frequency of between 100 and 1000 Hz) to the electrostatic filter 5. This application of small measuring pulses is necessary in pulse operation, not only while the characteristic curve is recorded, but always, otherwise the electrostatic filter 5 is uncoupled during the interpulse periods by means of the rectifier 4 from the high-voltage transformer 3.

In addition to a process for controlling the device which supplies power to an electrostatic filter 5 by means of a measuring and control unit 1, the preceding also described controlling the measuring and control unit 1 of a power supply device for an electrostatic filter 5 by means of a high order automation unit 6. Of course, using such an automation unit 6 to control several electrostatic filters 5 is also possible. The operating modes of the electrostatic filters are completely independent of one another in such a case.

We claim:

1. A process for controlling a power supply device which supplies power to an electrostatic filter, said power supply device comprising, an indirect converter, equipped with a measuring and control unit, and a high voltage transformer, comprising the steps of:

a) measuring primary-circuit values, including a primary voltage and a primary current, at the primary side of the transformer with said measuring and control unit;

b) automatically determining secondary-circuit values based on the measured primary-circuit values;

c) detecting a filter short circuit when a measured primary voltage of the high-voltage transformer drops below a specified minimum value and does not rise above said specified minimum value during a specified delay period and a filter current is greater than a specified maximum current;

d) blocking a current supply to an intermediate circuit of the indirect converter for a predeterminable time delay when said filter short circuit is detected;

e) incrementing and storing a count of said filter short circuit when said filter short circuit is detected; and f) disconnecting said indirect converter from the filter when the count of stored filter short circuits exceeds a limit within a predeterminable time span to deionize the filter when a sustained short circuit is present.

2. The process of claim 1 wherein said electrostatic filter is operated with direct current.

3. The process of claim 2 wherein said step of measuring primary-circuit values with said measuring and control unit includes measuring current and voltage of a primary side of said high-voltage transformer, and wherein said determined secondary-circuit states include filter current and filter voltage.

4. The process of claim 1 wherein said electrostatic filter is operated with current pulses.

5. The process of claim 4 wherein said step of measuring primary-circuit values with said measuring and control unit includes measuring current and voltage of a primary side of said high-voltage transformer, and wherein said determined secondary-circuit states include filter current and filter voltage.

6. The process of claim 4 further including a step of applying measuring pulses with short time intervals to said electrostatic filter during intervals between adjacent current pulses.

7. The process of claim 1 wherein said electrostatic filter is operated with current pulses superimposed over a direct current.

8. The process of claim 7 wherein said step of measuring primary-circuit values with said measuring and control unit includes measuring current and voltage of a primary side of said high-voltage transformer, and wherein said determined secondary-circuit states include filter current and filter voltage.

9. The process of claim 7 further including a step of applying measuring pulses with short time intervals to said electrostatic filter during intervals between adjacent current pulses.

10. The process of claim 1 wherein said step of measuring primary-circuit values with said measuring and control unit includes measuring current and voltage of a primary side of said high-voltage transformer, and wherein said determined secondary-circuit states include filter current and filter voltage.

11. The process of claim 1 further including a step of applying measuring pulses with short time intervals to said electrostatic filter during intervals between adjacent current pulses.

12. The process of claim 1 further including a step of detecting a filter breakdown when a filter voltage drops, in a short period of time, from a value above a specified minimum value, to a value less than a specified percentage of said specified minimum value.

13. The process of claim 12 wherein said short period of time is less than 200 ms, said specified minimum value is approximately 5 kV, and said percentage is 25%.

14. The process of claim 12 further comprising steps of:

incrementing a counter in the measuring and control unit when a filter breakdown is detected;

again testing said electrostatic filter after a specified, variable breakdown delay to determine whether a self-extinguishing filter breakdown is taking place or a non-self-extinguishing filter breakdown is taking place; and de-ionizing said electrostatic filter if a non-self-extinguishing filter breakdown is detected.

15. The process of claim 1 wherein said specified minimum value is between 60 and 100 volts, said specified minimum current is 10% of a maximum current, and said delay is approximately 250 ms.

16. The process of claim 1 further including steps of:

recording a characteristic filter curve in intervals, and calculating new setpoint values for controlling the indirect converter based on the characteristic filter curve recorded.

17. The process of claim 16 wherein manipulated variables, comparison variables, and times can be specified as new setpoint values.

18. The process of claim 17 wherein said manipulated variables include intermediate circuit current, said comparison variables include the minimum value for detecting a filter short circuit, and said times include breakdown delay.

19. The process of claim 17 further including steps of:

transmitting the characteristic curves of the measuring and control unit to a high order automation unit;

evaluating the characteristic curves of the measuring and control unit with said high order automation unit; and transmitting the new setpoint values to the measuring and control unit.

* * * * *